US007002560B2

(12) United States Patent
Graham

(10) Patent No.: US 7,002,560 B2
(45) Date of Patent: Feb. 21, 2006

(54) METHOD OF COMBINING DATA ENTRY OF HANDWRITTEN SYMBOLS WITH DISPLAYED CHARACTER DATA

(75) Inventor: Evan Graham, Port Moody (CA)

(73) Assignee: Human Interface Technologies Inc., Vancouver (CA)

( * ) Notice: Subject to any disclaimer, the term of this patent is extended or adjusted under 35 U.S.C. 154(b) by 339 days.

(21) Appl. No.: 10/263,797

(22) Filed: Oct. 4, 2002

(65) Prior Publication Data

US 2004/0070573 A1 Apr. 15, 2004

(51) Int. Cl.
*G09G 5/00* (2006.01)
*G06K 9/22* (2006.01)

(52) U.S. Cl. ........................ 345/179; 345/169; 382/313

(58) Field of Classification Search ........ 345/173–179, 345/441, 169, 156; 382/181, 189, 312–313
See application file for complete search history.

(56) References Cited

U.S. PATENT DOCUMENTS 5,220,649 A 6/1993 Forcier
5,276,794 A 1/1994 Lamb, Jr.
5,528,743 A 6/1996 Tou et al.
5,666,139 A * 9/1997 Thielens et al. ............ 345/173
6,041,137 A 3/2000 Van Kleeck
6,049,329 A * 4/2000 Zetts et al. ................. 345/179
6,256,009 B1 7/2001 Lui et al.
6,269,187 B1 7/2001 Frink et al.
6,359,572 B1 3/2002 Vale
6,389,166 B1 5/2002 Chang et al.
6,424,743 B1 7/2002 Ebrahimi
6,690,364 B1 * 2/2004 Webb ......................... 345/173
2003/0179201 A1 * 9/2003 Thacker ...................... 345/441

FOREIGN PATENT DOCUMENTS

EP 0689124 12/1995

OTHER PUBLICATIONS

Anonymous, "Graphical User Interface", Foldoc Free On-line Dictionary of Computing, Dec. 3, 2000, Retrieved From the Internet on Feb. 6, 2004.

* cited by examiner

*Primary Examiner*—Bipin Shalwala
*Assistant Examiner*—David L. Lewis
(74) *Attorney, Agent, or Firm*—Vermette & Co.

(57) ABSTRACT

A pen or stylus-operated graphical user interface for a computer or computing device, which includes a sensing surface having an area corresponding to a data input field, the data input field being conditioned for hand entering and editing of graphical input symbols, and handwriting recognition software operative to analyze the graphical input symbols and superimposing a display field of character data corresponding to the graphical input symbols on the data input field.

16 Claims, 9 Drawing Sheets

METHOD OF COMBINING DATA ENTRY OF HANDWRITTEN SYMBOLS WITH DISPLAYED CHARACTER DATA

FIELD

The present invention relates to a method for combining data entry produced with a stylus on a sensing surface such as a computer touch screen or digitising tablet, with display of the character data corresponding to each handwritten symbol. Handwriting recognition software is used to produce the character data corresponding to each symbol.

BACKGROUND

Systems with handwriting recognition include electronic notebooks and personal digital assistants (PDAs), which are portable computers incorporating a touch screen graphics display; and also non-portable computer workstations equipped with a digitising tablet and graphics display. Both types of systems have a pen input function when the user draws or writes with a stylus on the surface of the touch screen or digitising tablet. For handwritten data entry, such systems utilize a graphical user interface (GUI) presenting two spatially separate visual fields on the graphics display: first, a field where text characters are to be inserted by a text editing software program into a document (display field), usually showing a cursor to indicate the point of insertion for character data; and second, one or more fields (entry fields), where the user draws with the stylus to enter handwritten data.

After recognition and conversion of the handwritten data, the resulting character data appear in the display field at the point of insertion indicated by the cursor. In a typical design, not only are the entry and display fields spatially separate, but also the position, size, location, and other features of the character data bear little relation to the appearance of the original handwritten input.

When the stylus is moved outside of an entry field, it typically operates as a pointing device to invoke other functions of the computer, such as editing text contained in the display field, and changing the insertion point in the display field.

Typical prior methods of data entry with a stylus present the following difficulties to the user.

1) visual attention must constantly be shifted between the entry and display fields;

2) the stylus must be moved repeatedly between the display fields, to perform editing functions, and the entry fields, to continue entering handwritten data;

3) the separate entry fields may use as much as one half of the available graphics display area on a small hand-held device such as a PDA, reducing the amount of other information that can be displayed;

4) often, users must select the desired writing mode (characters, numbers, punctuation) and may forget which writing mode is currently active, or may enter the wrong type of handwritten symbol in an entry field; and 5) in many systems each entry field accepts a single character only, which must be recognized before the system will accept further handwritten data.

Accordingly, it is an object of the present invention to provide an improved means of data entry and editing by superimposing the input field and the display field on a GUI. It is a further object of the invention to provide an interface in which graphic symbols are entered by the user in an input field, and then are immediately replaced with the symbols' corresponding character data in approximately the same location. It is yet a further object of the invention to provide a means of correcting and editing character data without moving the stylus outside the input field.

SUMMARY OF THE INVENTION

According to the invention there is provided a pen or stylus-operable system for a computer or computing device, which includes a graphical user interface coupled to said computer and having a sensing surface, the sensing surface controlled by the graphical user interface and having means for hand entering and editing of graphical input symbols. Handwriting recognition software on the computer is operative to analyze the graphical input symbols one after another without interruption or delay and to superimpose a display field of character data corresponding to the graphical input symbols on the data input field.

Advantageously, the sensing surface is a display surface. Alternatively, the sensing surface could be a tablet separate from the display surface.

The handwriting recognition software also initiates an action based upon the graphical input symbol. Preferably, the action is an editing mode wherein the pen or stylus contacts the sensing surface without moving for a predetermined minimum amount of time.

Symbol recognition of handwritten input is a default mode and editing mode is initiated with a timeout.

Preferably movement of the pen, in predefined ways, without being removed from data input field, causes corresponding editing functions to be effected.

The character data may be corrected and edited in the editing mode without moving a cursor for the pen or stylus outside the data input field of the sensing surface.

In another aspect of the invention there is provided a apparatus for combining data entry of handwritten symbols with displayed character data in a pen or stylus-operable graphical user interface for a computer or computing device, which includes means for recording and displaying handwritten graphical input symbols as they are entered on a data input field of a display surface; and handwriting recognition software for analysing continuously, without interruption or delay and automatically superimposing on the display field character data corresponding to the graphical input symbols.

Preferably, the means for recording is a sensing surface operative to receive and record the graphical input symbols. The means for displaying is the display surface or, alternatively may be a part of the display surface.

The handwriting recognition software may initiate an action based upon the graphical input symbol. The action may be an editing mode when the pen or stylus contacts the display surface for a predetermined minimum time without moving.

Movement of the pen in predefined ways, without being removed from the data input field, may cause corresponding editing functions to be effected.

Character data may be corrected and edited in the editing mode without moving the pen or stylus outside the data input field.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
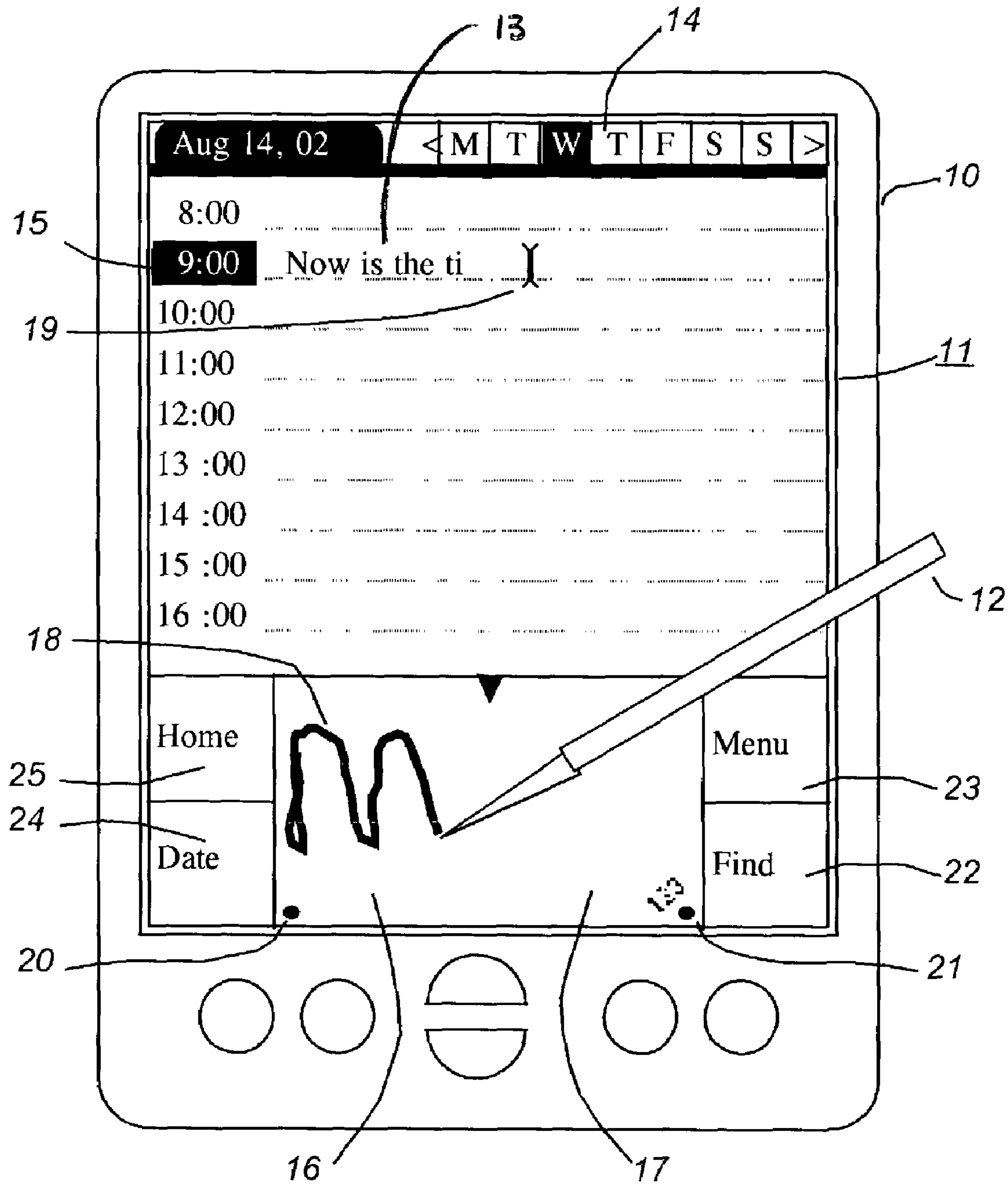
FIG. 1 is a diagram of a typical prior art handwriting recognition graphical user interface for a portable digital assistant device.

FIG. 1 depicts a prior art handwriting recognition graphical user interface (or GUI) 11 for a hand-held personal digital assistant (or PDA) device 10, running an appointment scheduler software program. The appointment scheduler represents a typical software application program, widely used on many PDAs, which is suited to handwritten data entry, as a standard keyboard for text entry is too large to be easily portable, and setting up and taking apart a special portable keyboard for each use of the scheduler is overly time-consuming.

The GUI is displayed on a touch screen 11, such as a liquid crystal display, operable by drawing with a stylus 12 on the display surface. Appointments are represented within a document containing a display field 13 for each appointment time. The day of the week is selected by tapping with the stylus on a menu 14 at the top of the document. The time of day is selected by tapping with the stylus on a particular time 15 at the left of the document. To add text to the selected appointment time, handwritten characters are entered one at a time in special handwriting recognition areas (entry fields) on the GUI, one entry field for alphabetic characters 16, and a second entry field for numeric characters 17. After a handwritten character is entered 18, handwriting recognition software processes the input data, recognizes the handwritten input, and displays the resulting character in the display field 13 at the location of the edit cursor 19. Then, the handwritten data 18 is erased, and the edit cursor 19 is shifted to accept the next input character.

If the user has difficulties using the handwriting recognition, they may display one of two small graphical keyboards by touching special areas with the stylus, one for alphabetic characters 20, and one for numeric and symbolic characters 21.

To modify text in the document, the user must touch the display field with the stylus to position the edit cursor 19, and then move the stylus back to the entry fields 16, 17, or to the graphical keyboard, to perform operations such as deleting characters, or inserting characters and spaces. Other supporting functions of the appointment scheduler are invoked by tapping with the stylus on areas to find text 22, display a menu of editing functions 23, go to another date 24, or display the start-up screen of the PDA 25.

The user's visual attention must constantly be shifted between the entry field 26 and display fields 16, 17, both to ensure that the handwriting recognition software has correctly interpreted each input character, and also to remind them of the context to decide on the next character to be entered. To perform other operations, the stylus must be moved repeatedly between several areas on the display: the display field 13 to position the text cursor 19; the entry fields 16, 17 to continue entering handwritten data; and the menu buttons 22 through 25 to invoke editing and other supporting functions. In this prior art design, much of the space on the display is used for hand writing recognition and menu buttons, limiting the space available to display information relating to appointments. The user also must wait until each handwritten character is recognized and displayed before starting to enter the next handwritten character, severely limiting the speed of operation. If the user enters the wrong type of handwritten character, for example a numeric character in the alphabetic input field 16, a recognition error occurs and must be corrected.

Figure 2:
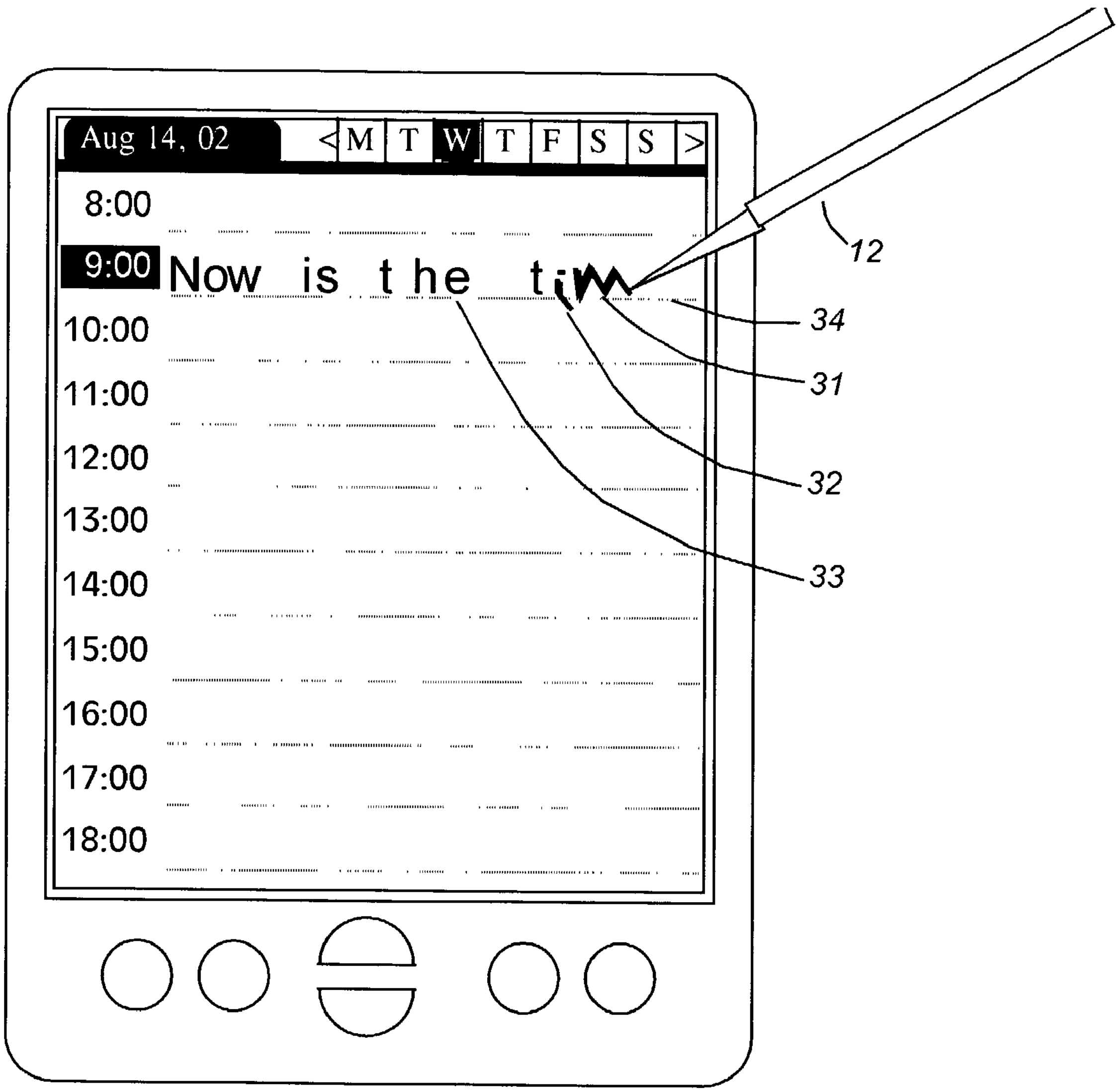
FIG. 2 is a sample handwriting recognition graphical user interface for a portable digital assistant device, in accordance with the present invention.

The problems described above are resolved by the improved handwriting recognition graphical user interface according to the present invention, illustrated in FIG. 2, which shows a scheduler performing the equivalent functions as the example of FIG. 1. The handwriting recognition graphical user interface according to the present invention may be used in a variety of applications such as spreadsheets, internet browsers, etc. in much the same manner as the scheduler program, used here for purposes of illustration. Referring again to FIG. 2, the day of the week and time of an appointment are selected by tapping with the stylus, as in the previous example. The interface according to the present invention appears much simpler than the previous example, as it requires no separate areas for text recognition, no menu buttons, and no graphical keyboards for its operation.

Referring again to FIG. 2., data input is accomplished by simply drawing each handwritten character 31 with the stylus 12 near its desired location on the document, using a comfortable size that closely matches the user's natural handwriting. The user may proceed with additional handwritten entries as quickly as they are able, while the handwriting recognition software processes previously entered characters 32. As each handwritten character is recognized, it is replaced by corresponding character data from a computer font of suitable size 33, in approximately the same location as the original handwritten input, except that the character data are aligned to the nearest baseline 34.

Note that in addition to, or as an alternative to displaying corresponding character data, the handwriting recognition software may be programmed to perform other actions. For example, in the present invention when the user draws the symbol '-', performed with a stroke from right to left, previously entered character data underlying the stroke are deleted.

Figure 3:
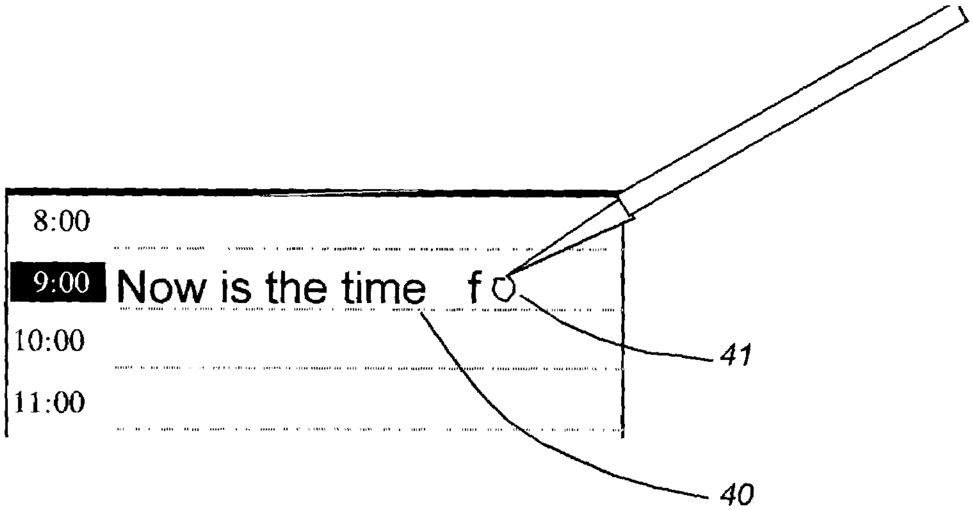
FIG. 3 shows the automatic formatting of previously entered handwritten data.

FIG. 3 illustrates how character data are automatically aligned when the user lifts the stylus from the touch screen and waits for a given period of time, approximately two seconds in this example, before entering additional handwritten characters. Previously entered character data 40 are automatically formatted, according to the computer font metrics, to increase readability and provide additional space for new handwritten data entry 41. The automatic formatting can also be invoked through a menu function, as described below.

Figure 4:
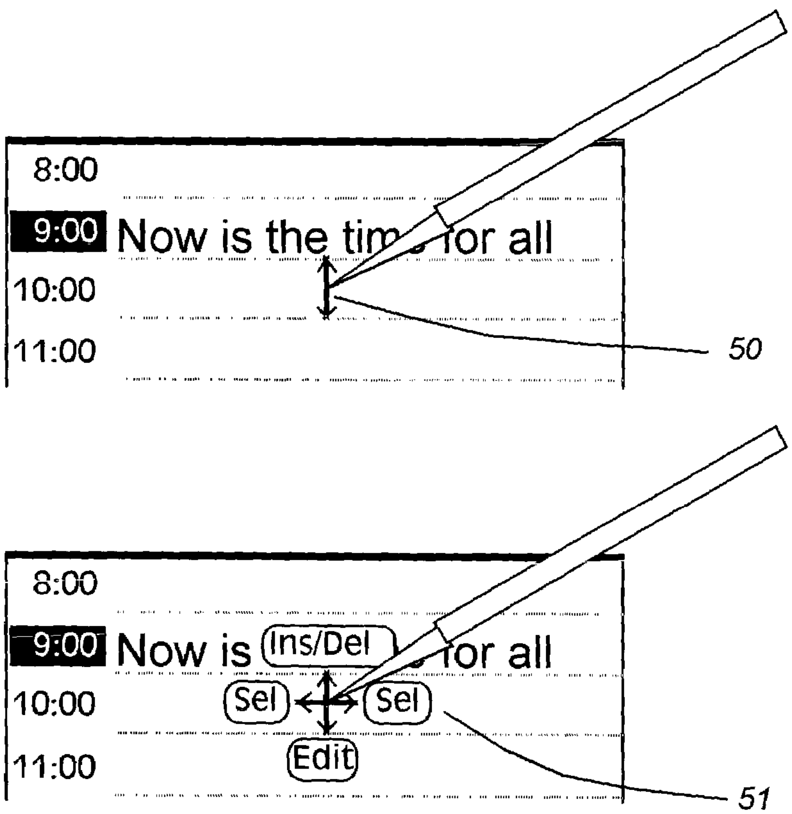
FIGS. 4 through 8 show the method of performing various editing functions using an editing mode.

FIG. 4 illustrates the method of invoking editing functions in the same field that is used for handwritten input. Normally, when drawing handwritten characters with the stylus, the user touches the stylus to the display and moves it immediately to draw a handwritten symbol. If the stylus is held in contact with the touch screen and is not moved for a predetermined amount of time (200 to 500 ms depending on user preference), an editing cursor 50 appears to indicate the system is in editing mode, whereupon subsequent movements of the stylus will operate various editing functions as described below. If the user does not move the stylus for an additional period of time (600 ms in this example) a menu prompt 51 appears as close as is practicable to the location of the stylus tip, to remind the user how to invoke the various editing functions. In editing mode, movements of the stylus to the left or right will cause selection of text for further operations such as copy, paste, etc.; movement up will allow insertion and deletion of text at the tip of the stylus; and movement down will allow editing functions such as split and join, and will also allow a menu to be displayed to invoke additional editing or operating system functions.

Figure 5:
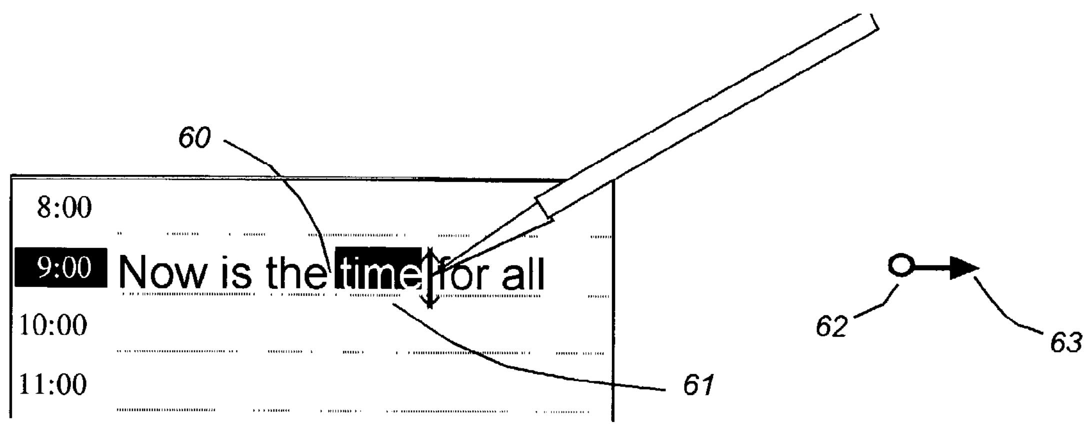

FIG. 5 illustrates selection of text in editing mode. The stylus is held at one edge of the selection area 60 until the edit cursor appears. Then the stylus is moved, to the right in this example, to indicate the other edge of the selection area 61 and lifted. This editing gesture, and others described below, can be explained using a graphical notation 62, 63. The open circle 62 indicates that the stylus is held in one position for a predetermined amount of time, until editing mode is activated. The arrow 63 indicates that the stylus is then moved to the right to select text on the display.

Figure 6:
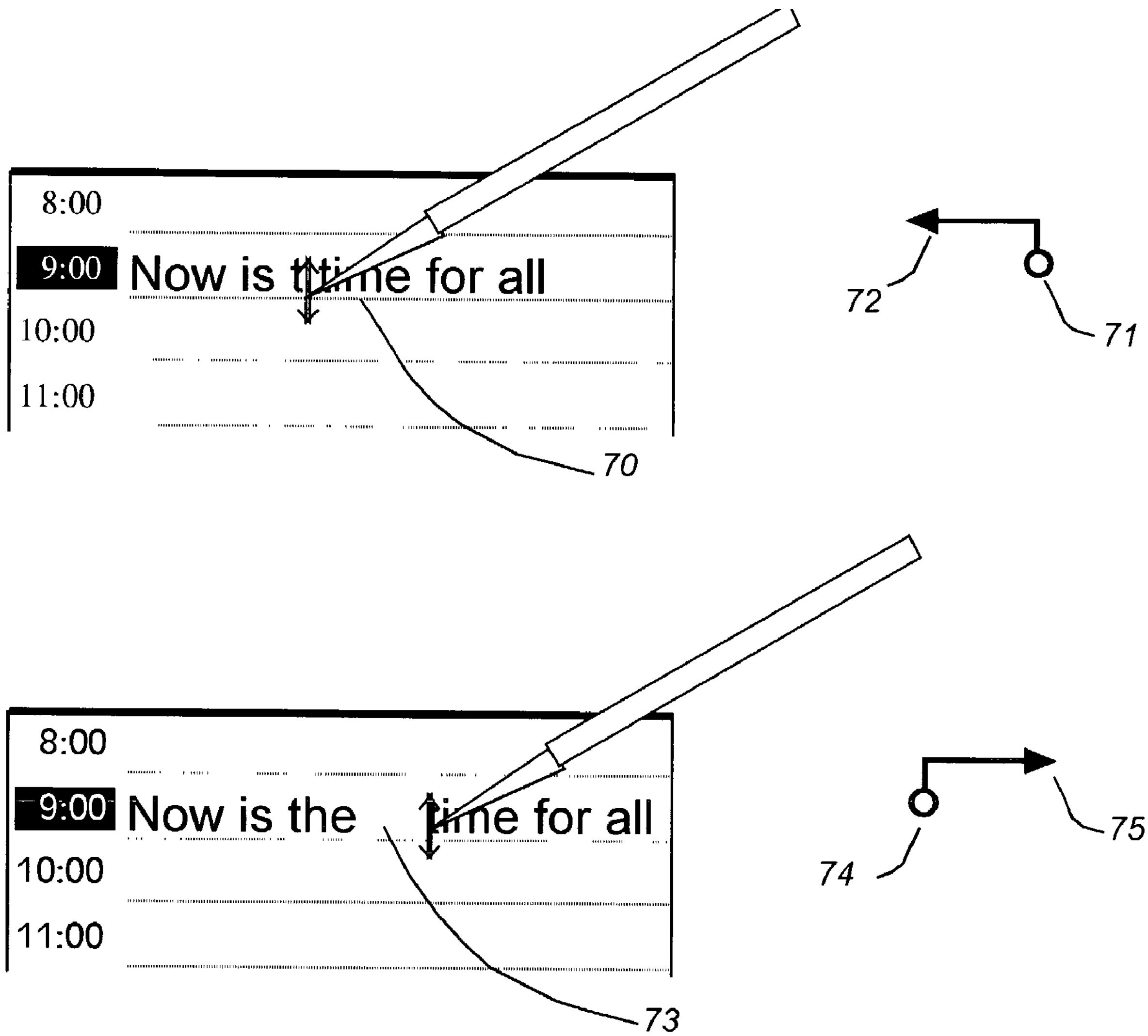

FIG. 6 illustrates insertion and deletion of text in editing mode. To delete text, the stylus is first held below the right boundary 70 of the text to be deleted until the editing mode is symbolized by 71 and 74 is activated. Then the stylus is moved up into the text to be deleted. Moving left 72 will delete characters 70 on the display. Moving right 75 will shift following text to the right, and insert space 73 for additional handwritten input. If the following text runs off the right edge of the display, the line is split as soon as the stylus is lifted, placing the extra following text on a new line below.

Figure 7:
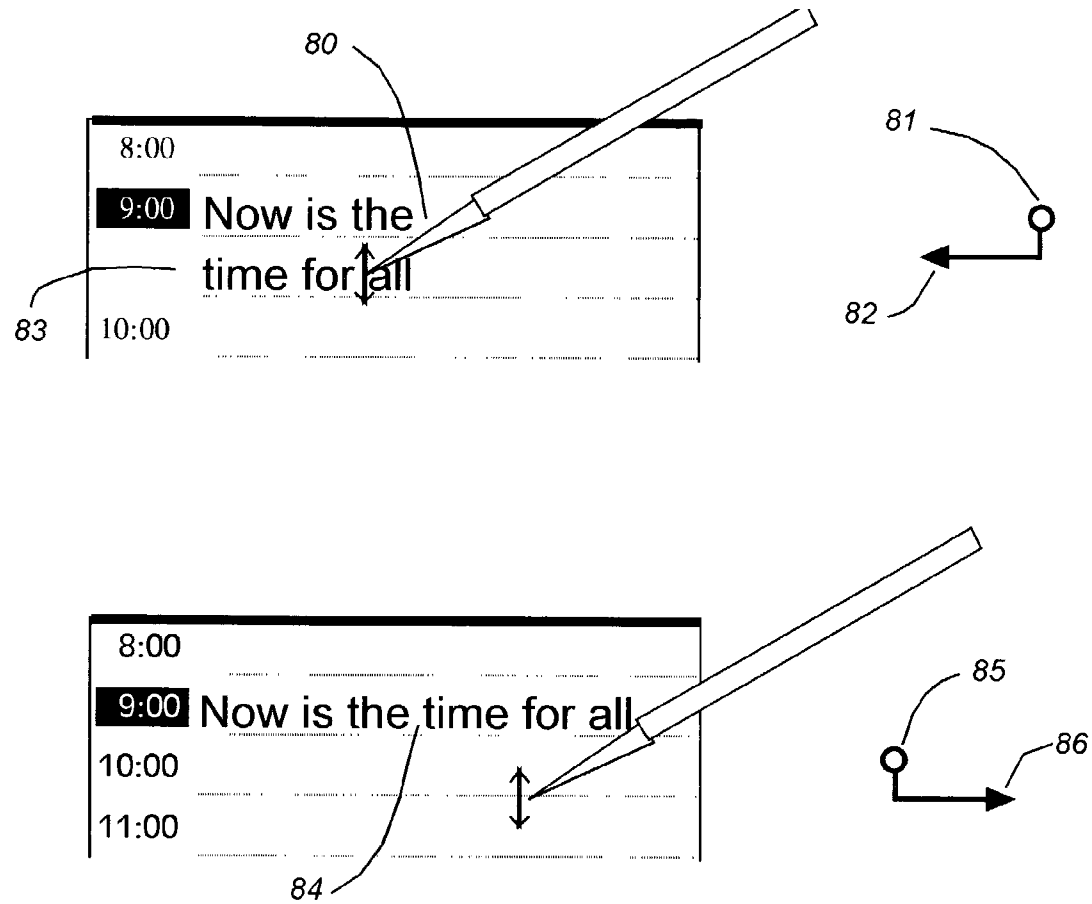

FIG. 7 shows splitting and joining of lines of text in editing mode. To split a line, the stylus is placed on the text at the point 80 at which the line is to be split, and held at point 81 to activate the editing mode. A movement down and to the left 82 splits the line, putting the following text on a new line below 83. To join a line, the stylus is placed at the end of the selected line of text 84, and held 85 to activate editing mode. A movement down and to the right 86 joins the text from the following line to the selected line.

Figure 8:
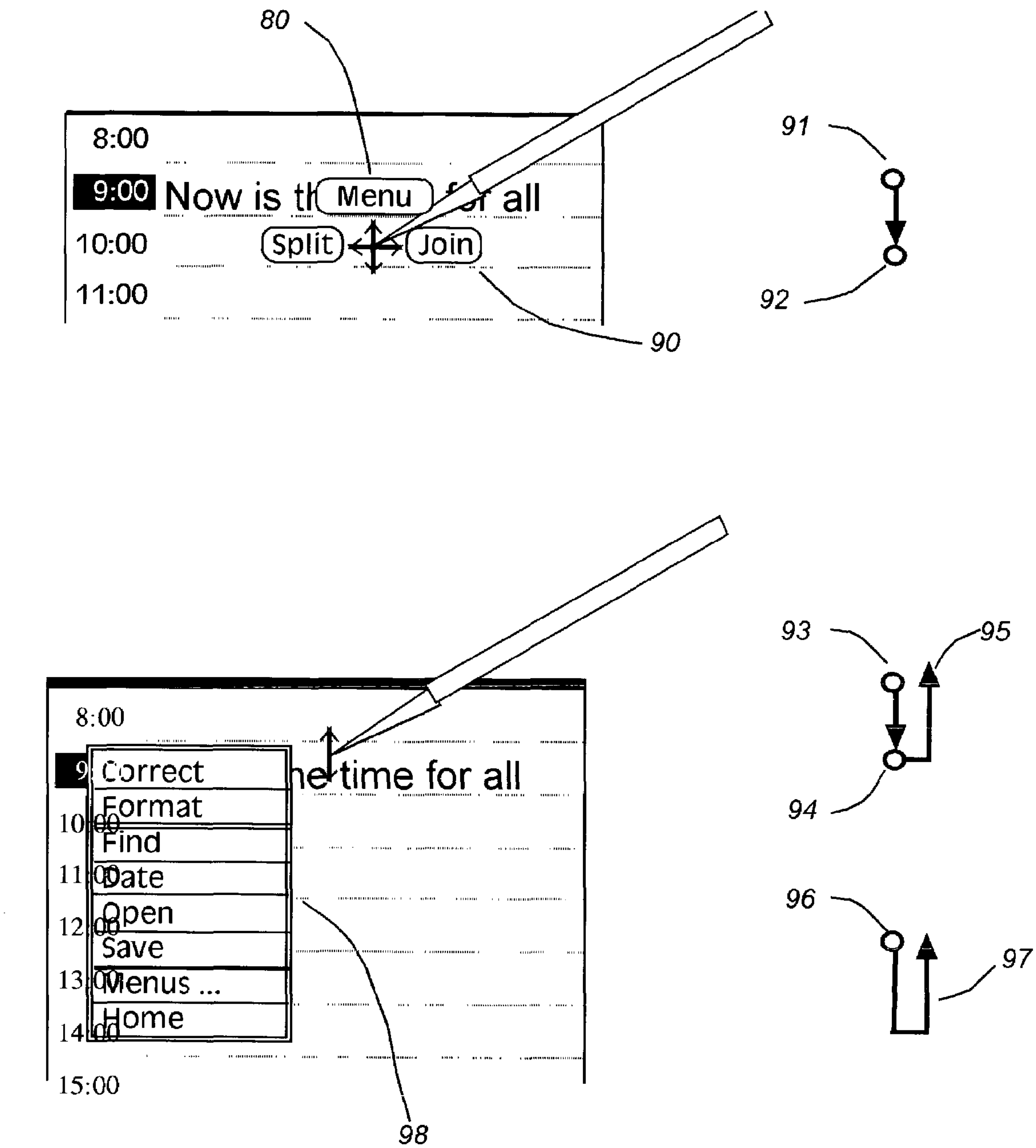

FIG. 8 illustrates how additional functions are performed in editing mode. As in splitting and joining lines of text above, the stylus is held at points 91, 93, 96 until the editing mode is activated, and then moved down. At point 91 and 94, if the stylus is held for an additional period of time (600 ms in this example) a menu prompt 90 appears to remind the user of available editing functions. Moving the pen up 95 will display another menu 98 of additional operations that may be performed. At this point, a menu item can be activated by touching with the stylus, or the menu may be removed by touching a point on the display outside the region of the menu with the stylus. The experienced user will be able to access the menu 98 of additional functions by holding the pen to activate the editing mode 96, then moving the pen down and up in a continuous motion 97 to display the menu 98.

Figure 9:
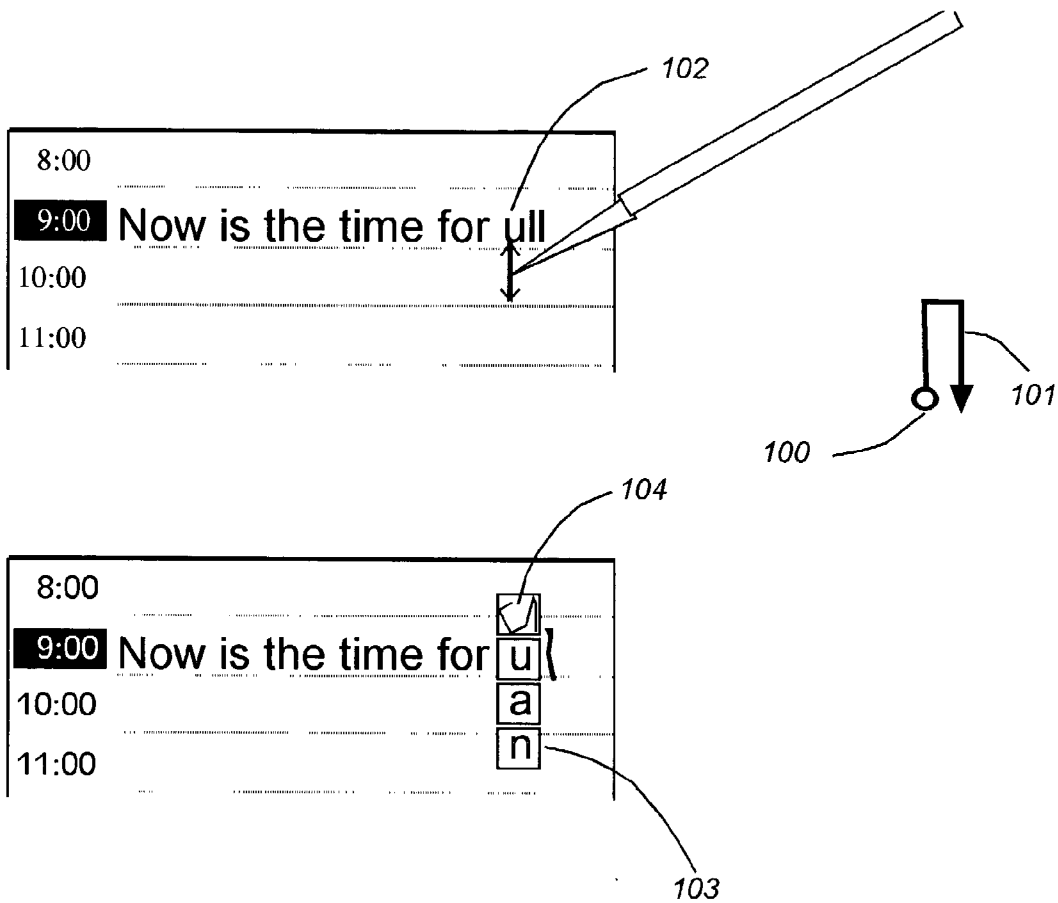
FIG. 9 shows the method of correcting an error in from handwriting recognition software.

FIG. 9 illustrates one way of correcting an error in handwriting recognition if the handwriting recognition software produces several possible matches for each handwritten character, but only displays data for the most likely candidate. The stylus is held below the character 102 to be corrected until the editing mode is activated 100. Moving the stylus up into the character to be corrected, then down 101, displays a menu 103 of other candidate matches produced by the handwriting recognition software, including the original handwritten symbol 104 for comparison. Touching a menu item replaces the character with the one selected by the menu item. Touching the original handwritten symbol 104 with the stylus allows the user to resort to other means, such as choosing from a complete graphical list of characters, to correct the error.

Figure 10:
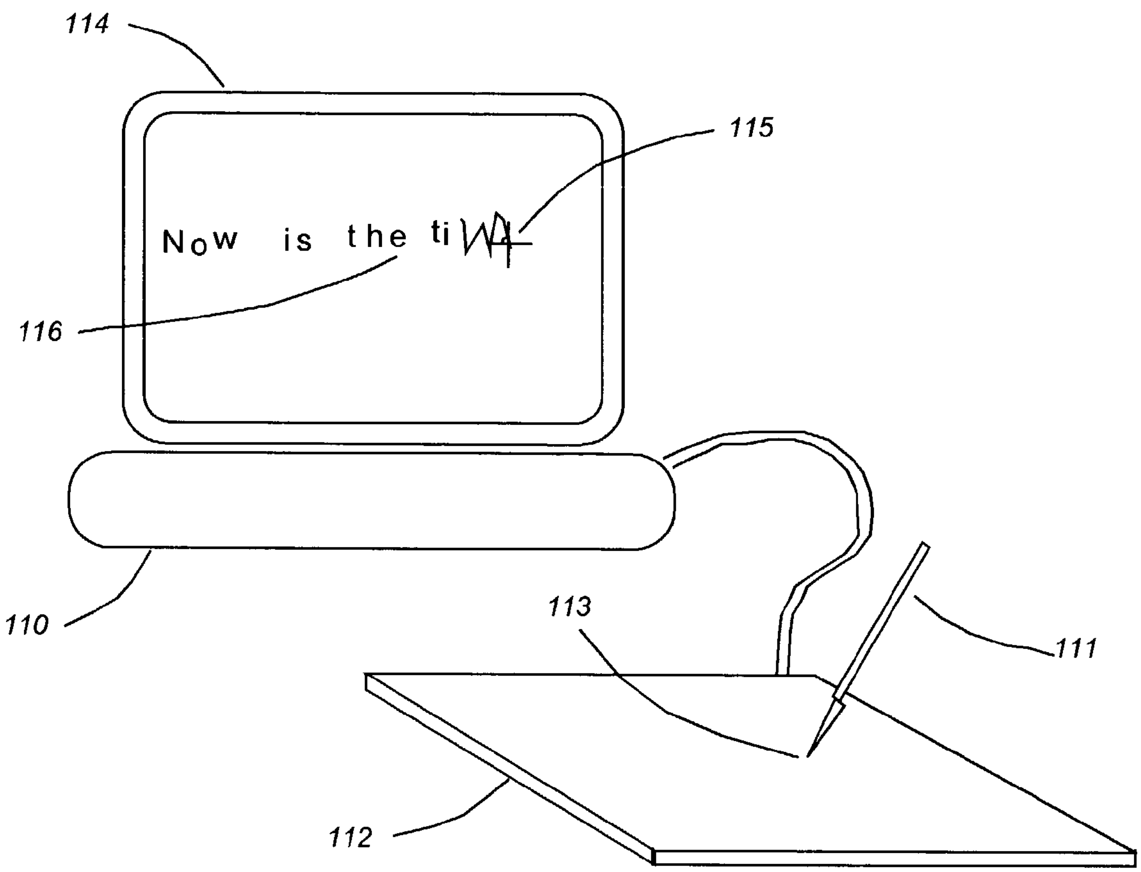
FIG. 10 shows a sample handwriting recognition graphical user interface in accordance with an alternate embodiment of the present invention.

FIG. 10 illustrates an alternate embodiment of the present invention, adapted for use with a digitising tablet and graphics display. A computer system is shown, consisting of a processing unit 110 connected to a digitising tablet 112 which is operated by a stylus 111. The computer system also drives a display monitor 114. When the stylus is in proximity to the tablet, a cursor 115 is displayed; the cursor's position on the display screen accurately tracks the relative position of the stylus on the digitising tablet. The user brings the stylus in contact with the digitising tablet and draws, whereby the corresponding handwritten input appears on the display at the cursor position 115. In this embodiment of the invention, as in the embodiment described above, the user enters handwritten symbols while handwriting recognition software processes previously entered symbols and replaces the handwritten input with character data. An editing mode, and subsequent operations such as text selection, deletion, insertion, splitting and joining lines, and correcting handwriting recognition errors, are accomplished by the user in the manner described above, the only difference being that the stylus operates in contact with the digitising tablet 112 instead of directly on the display monitor 114.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A pen or stylus operable system for a computer, comprising:

(a) a graphical user interface coupled to said computer and having a sensing surface said sensing surface having an area corresponding to a data input field, said sensing surface controlled by said graphical user interface and having means for hand entering and editing of graphical input symbols;

(c) handwriting recognition software on said computer operative to analyze said graphical input symbols one after another without interruption or delay and to automatically superimpose on and replace said graphical input symbols with a display field of character data corresponding to said graphical input symbols on said data input field.

2. An interface according to claim 1, wherein said sensing surface is display surface.

3. An interface according to claim 1, wherein said sensing surface is a tablet separate from a display surface.

4. An interface according to claim 1, wherein said handwriting recognition software also initiates an action based upon said graphical input symbol.

5. An interface according to claim 1, wherein said handwriting recognition software initiates an editing mode when said pen or stylus contacts said sensing surface without moving for a predetermined minimum amount of time.

6. An interface according to claim 5, wherein symbol recognition of handwritten input is a default mode and editing mode is initiated with a timeout.

7. An interface according to claim 5, wherein movement of said pen, in predefined ways, while being held in continuous contact with the sensing surface, without being removed from said data input field, causes corresponding editing functions to be effected.

8. An interface according to claim 7, wherein said character data is corrected and edited in said editing mode without moving a cursor for said pen or stylus outside said data input field of said sensing surface.

9. Apparatus for combining data entry of handwritten symbols with displayed character data in a pen or stylus-operable graphical user interface for a computer or computing device, comprising:

(a) means for recording and displaying handwritten graphical input symbols as they are entered on a data input field of a display surface; and (b) user recognition software for analyzing said graphical input symbols one after another continuously without interruption or delay and automatically superimposing on and retlacing said graphical input symbols with display field character data corresponding to said graphical input symbols.

10. Apparatus according to claim 9, wherein said means for recording is a sensing surface operative to receive and record the graphical input symbols.

11. Apparatus according to claim 10, wherein said means for displaying is said display surface.

12. Apparatus according to claim 10, wherein said sensing surface is at least part of said display surface.

13. Apparatus according to claim 9, wherein said handwriting recognition software also initiates an action based upon said graphical input symbol.

14. Apparatus according to claim 9, wherein said handwriting recognition software initiates an editing mode when said pen or stylus contacts said display surface for a predetermined minimum time without moving.

15. Apparatus according to claim 14, wherein movement of said pen, without being removed from said data input field, in predefined ways, while held in continuous contact with the sensing surface causes corresponding editing functions to be effected.

16. Apparatus according to claim 15, wherein character data is corrected and edited in said editing mode without moving a cursor for said pen or stylus outside said data input field.

* * * * *